United States Patent
Yamashita et al.

(10) Patent No.: US 7,285,348 B2
(45) Date of Patent: Oct. 23, 2007

(54) FUEL CELL

(75) Inventors: Shoji Yamashita, Kokubu (JP);
Takashi Ono, Kokubu (JP); Shoji Kohsaka, Kokubu (JP); Kazuto Matsukami, Kokubu (JP); Masato Nishihara, Kokubu (JP)

(73) Assignee: Kyocera Corporation, Tokyo (JP)

( * ) Notice: Subject to any disclaimer, the term of this patent is extended or adjusted under 35 U.S.C. 154(b) by 590 days.

(21) Appl. No.: 10/789,932

(22) Filed: Feb. 27, 2004

(65) Prior Publication Data

US 2004/0219411 A1   Nov. 4, 2004

(30) Foreign Application Priority Data

| Feb. 28, 2003 | (JP) | ............................. 2003-054797 |
| Mar. 27, 2003 | (JP) | ............................. 2003-087338 |
| Nov. 26, 2003 | (JP) | ............................. 2003-396202 |

(51) Int. Cl.
*H01M 8/12* (2006.01)
*H01M 8/24* (2006.01)

(52) U.S. Cl. ............................. 429/31; 429/38; 429/44

(58) Field of Classification Search ............... 429/31, 429/38, 44
See application file for complete search history.

(56) References Cited

U.S. PATENT DOCUMENTS

| 3,228,798 | A |   | 1/1966  | Hart           |         |
| 3,984,303 | A |   | 10/1976 | Peters et al.  |         |
| 4,476,196 | A |   | 10/1984 | Poeppel et al. |         |
| 4,874,678 | A | * | 10/1989 | Reichner       | 429/31 X |
| 5,185,219 | A | * | 2/1993  | Ishihara et al.| 429/31  |
| 6,423,436 | B1| * | 7/2002  | George et al.  | 429/31  |
| 2003/0224240 | A1 | * | 12/2003 | Yamashita et al. | 429/44 |

FOREIGN PATENT DOCUMENTS

| EP | 0 055 011 | 6/1982 |
| EP | 0 055 016 | 6/1982 |
| EP | 0 285 727 | 11/1987 |
| JP | 05-036417 | 2/1993 |
| JP | 2700390   | 10/1997 |

* cited by examiner

*Primary Examiner*—Stephen J. Kalafut
(74) *Attorney, Agent, or Firm*—Hogan & Hartson LLP

(57) ABSTRACT

A solid oxide fuel cell comprising an electrically conducting electrode-support substrate, an inner electrode layer, a solid electrolyte layer, an outer electrode layer and an interconnector, wherein said electrode-support substrate includes a flat plate having two flat surfaces which are in parallel with each other and forming a plurality of gas flow passages therein, and curved portions located at both ends of said flat plate, and said outer electrode layer is laminated on the solid electrolyte layer so as to be opposed to the other surface of said flat plate where the interconnector is not provided but so as not to be opposed to said curved portions. The solid oxide fuel cell features a small voltage drop, an increased output density, and is easily produced exhibiting stable characteristics.

18 Claims, 3 Drawing Sheets

$L_2 > L_1$
$L_3 > L_1$ $R_2(Z) > R_1(Y)$

FUEL CELL

BACKGROUND OF THE INVENTION

1. Field of the Invention

The present invention relates to a solid oxide fuel cell.

2. Description of the Related Art

In recent years, there have been proposed a variety of fuel cell assembles by accommodating stacks of fuel cells in the containers to provide energy of the next generation. There have been known a variety of kinds of fuel cells, such as those of the solid high molecular type, those of the phosphoric acid type, those of the molten carbonate type and those of the solid electrolyte type. Among them, the fuel cell of the solid electrolyte type features a high power generating efficiency though its operation temperature is as high as 800 to 1000° C. and offers an advantage of utilizing the waste heat, and its study and development have therefore been forwarded.

The solid oxide fuel cells constituting the fuel cell assemblies can be roughly grouped into those of the cylindrical type and those of the flat plate type. Those of the cylindrical type can be further divided into those having a circular shape in cross section (circular type) and those having a flat elliptic shape in cross section (flat type). The solid oxide fuel cells of the flat type have such advantages as higher output densities than those of the circular type. Their representative example may be the one obtained by providing a solid electrolyte layer and an interconnector on an internal electrode substrate of a flat elliptic shape and providing an external electrode layer on the solid electrolyte layer (see, for example, Japanese Patent No. 2700390 and Japanese Unexamined Patent Publication (Kokai) No. 5-36417).

The fuel cell proposed by the above prior art such as Japanese Patent No. 2700390 is, for example, as illustrated in FIG. 6 wherein an inner electrode substrate 30 having gas flow passages comprises a flat plate 30a and curved portions 30b formed at both ends thereof, and an interconnector 32 is provided on one flat surface of the flat plate 30a. Further, a solid electrolyte layer 34 is laminated on the inner electrode substrate 30 so as to cover a portion where the interconnector 32 has not been provided, and an outer electrode layer 36 is laminated on the solid electrolyte layer 34. As will be understood from FIG. 6, the outer electrode layer 36 is laminated on the solid electrolyte layer 34 so as to surround the other surface of the inner electrode substrate 30 (surface of the side where the interconnector 32 has not been formed) as well as the curved portions 30b.

In the solid oxide fuel cell of the above structure, curved portions are formed on the inner electrode substrate to prevent the damage at the time of molding and to increase the strength, and the electrode area is increased to increase the output density. According to the study by the present inventors, however, it has been learned that portions of the outer electrode layer 36 located on the curved portions 30b of the inner electrode substrate 30 are facing the interconnector 32 and do not effectively work as an electrode and do not contribute to enhancing the output density. Namely, in these portions, a current path is lengthened between the outer electrode layer 36 and the interconnector 32, and it is considered that the voltage drops to a large extent. In the portions of the outer electrode layer 36 located on the curved portions 30b, further, it is difficult to uniform the thickness thereof and, hence, dispersion occurs in the characteristics.

SUMMARY OF THE INVENTION

It is therefore an object of the present invention to provide a solid oxide fuel cell which permits the voltage to drop little, features an increased output density, easily produced and exhibits stable characteristics.

According to the present invention, there is provided a fuel cell comprising an electrically conducting electrode-support substrate, an inner electrode layer, a solid electrolyte layer, an outer electrode layer and an interconnector, wherein the electrode-support substrate includes a flat plate having two flat surfaces which are in parallel with each other and forming gas flow passages therein, and curved portions located at both ends of the flat plate;

the interconnector is formed on one surface of the flat plate of the electrode-support substrate;

the inner electrode layer is formed on the other flat surface of the electrode-support substrate where the interconnector has not been provided;

the solid electrolyte layer is laminated on the electrode-support substrate so as to cover the inner electrode layer, and is extending from the other surface of the flat plate up to both side ends of the interconnector passing through both curved portions; and the outer electrode layer is laminated on the solid electrolyte layer so as to be opposed to the other surface of the flat plate but so as not to be opposed to the curved portions, and its both ends are located on the outer sides of both side ends of the interconnector.

In the above fuel cell of the present invention, it is also allowable to use the inner electrode as the electrode-support substrate. For example, the invention further provides a fuel cell comprising an inner electrode substrate, a solid electrolyte layer, an outer electrode layer and an interconnector, wherein the inner electrode substrate includes a flat plate having two flat surfaces which are in parallel with each other and forming gas flow passages therein, and curved portions located at both ends of the flat plate;

the interconnector is formed on one surface of the flat plate of the inner electrode substrate;

the solid electrolyte layer is laminated on the inner electrode substrate, and is extending from the other surface of the flat plate up to both side ends of the interconnector passing through both curved portions; and the outer electrode layer is laminated on the solid electrolyte layer so as to be opposed to the other surface of the flat plate where the interconnector has not been provided but so as not to be opposed to the curved portions, and its both ends are located on the outer sides of both side ends of the interconnector.

Namely, in the fuel cell of the present invention, an important feature resides in that the outer electrode layer is not opposed to the curved portions of the electrode-support substrate (or the inner electrode substrate) but is opposed to the flat surface only on the side where the interconnector is not provided. Upon forming the outer electrode layer on the above position, the outer electrode layer and the interconnector are opposed to each other all through the flat plate, whereby the electric current flows in a direction of thickness of the electrode support substrate, the electric resistance decreases, the voltage drop is suppressed, and the output density increases. As will be demonstrated in Examples and in Comparative Example appearing later, when compared at a current density of 0.4 A/cm² while generating electricity at 850° C., the fuel cell in which the outer electrode layer is so formed as to be-opposed to the curved portions has a voltage drop of 230 mV and an output density of 0.55 W/cm² (Comparative Example 1) whereas the fuel cell of the present invention in which the outer electrode layer is formed on the flat plate only has a voltage drop of 180 mV and an output density of 0.65 W/cm² (Example 1) suppressing the voltage drop and increasing the output density.

In the present invention, further, it is important that both ends of the outer electrode layer are located on the outer sides of both side ends of the interconnector (or, in other words, are formed to possess an area larger than that of the interconnector). By forming the outer electrode layer having an area larger than that of the interconnector, a predetermined effective electrode area is maintained despite the position of the outer electrode layer is deviated to some extent at the time of molding, and stable characteristics are maintained.

In the present invention, further, the external electrode layer is formed on the flat plate and possesses a uniform thickness, suppressing dispersion in the thickness depending upon the lots and maintaining stable characteristics.

DETAILED DESCRIPTION OF THE INVENTION

The invention will now be described based on a concrete embodiment illustrated in the accompanying drawings.

Figure 1:
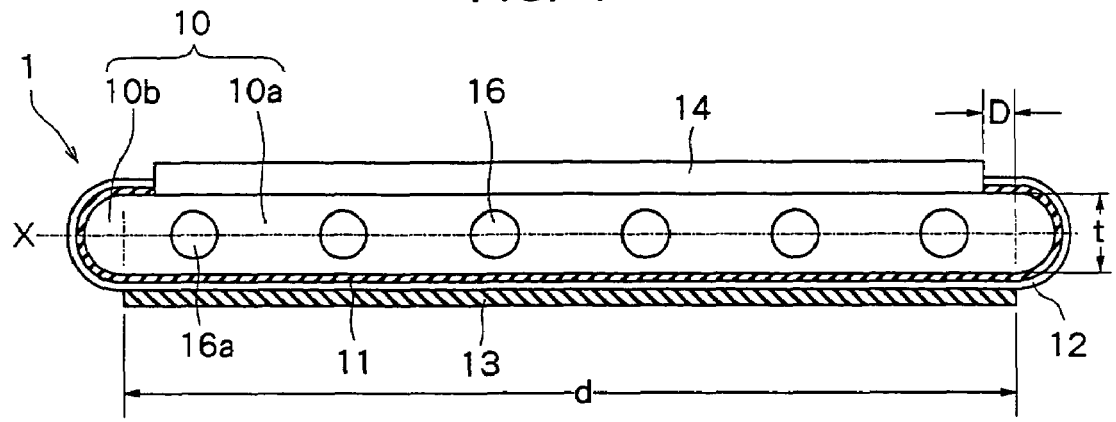
FIG. 1 is a transverse sectional view illustrating a representative structure of a fuel cell of the present invention.

Referring to FIG. 1 illustrating a representative structure of a fuel cell of the present invention, a fuel cell generally designated at 1 includes an electrode-support substrate 10, a fuel electrode layer 11 which is an inner electrode layer, a solid electrolyte layer 12, an oxygen electrode layer 13 which is an outer electrode layer, and an interconnector 14.

As will be obvious from FIG. 1, the electrode-support substrate 10 includes a flat plate 10a having two flat surfaces and a uniform thickness, and curved portions 10b formed at both ends of the flat plate 10a. A plurality of gas flow passages 16 are formed in the flat plate 10a.

The interconnector 14 is provided on one surface of the flat plate 10a of the electrode-support substrate 10, the fuel electrode layer 11 is laminated on at least the other surface of the flat plate 10a and is extending up to one surface of the flat plate 10a, and is joined to both side ends of the interconnector 14. Further, the solid electrolyte layer 12 is provided to cover at least the fuel electrode layer 11, and is laminated on the whole surface of the fuel electrode layer 11 as shown in FIG. 1, and is joined to both side ends of the interconnector 14. The oxygen electrode layer 13 is laminated on the solid electrolyte layer 12, and is located on the surface of the flat plate 10a of the electrode-support substrate 10 of the side where the interconnector 14 is not provided in a manner to be opposed to the fuel electrode layer 11 as well as to the interconnector 14.

In the above fuel cell, a fuel gas (hydrogen) is fed into the gas flow passages 16 in the electrode-support substrate 10, an oxygen-containing gas such as the air is fed to the outer side of the oxygen electrode layer 13, and the temperature is elevated up to a predetermined operation temperature to generate electricity. That is, an electrode reaction of the following formula (1) takes place on the oxygen electrode layer 13 and an electrode reaction of the following formula (2) takes place on the fuel electrode layer 11 to generate electricity, Oxygen electrode: (1)

Fuel electrode: (2)

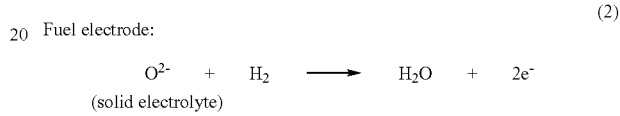

The electric current produced by the above generation is collected through the interconnector 14 provided on the electrode-support substrate 10.

(Electrode-Support Substrate 10)

The electrode-support substrate 10 must be gas-permeable for permitting the fuel gas to pass through up to the fuel electrode layer and must be electrically conducting for collecting electricity through the interconnector 14, and is made of a porous electrically conducting ceramic material (or cermet) that satisfies the above requirements. From the standpoint of producing the substrate 10 by co-firing the fuel electrode layer 11 and the solid electrolyte layer 12, it is desired that the electrode-support substrate 10 is formed by using a metal component of the iron group and a particular rare earth oxide.

The metal component of the iron group is for imparting electrically conducting property to the electrode-support substrate 10, and may be a simple metal of the iron group, an oxide of a metal of the iron group, an alloy of a metal of the iron group or an oxide of an alloy of a metal of the iron group. Metals of the iron group include iron, nickel and cobalt, and any one of them can be used. From the standpoint of cost and stability in the fuel gas, however, it is desired that Ni and/or NiO are contained as components of the iron group.

The rare earth oxide component used together with the metal component of the iron group is for bringing the coefficient of thermal expansion of the electrode-support substrate 10 close to that of the solid electrolyte layer 12. To maintain a high electric conductivity, to prevent the elements from diffusing into the solid electrolyte layer 12 and to eliminate the effect caused by the diffusion of elements, it is desired to use an oxide containing at least one kind of rare earth element selected from the group consisting of Y, Lu, Yb, Tm, Er, Ho, Dy, Gd, Sm and Pr. Examples of the rare earth oxide include $Y_2O_3$, $Lu_2O_3$, $Yb_2O_3$, $Tm_2O_3$, $Er_2O_3$, $Ho_2O_3$, $Dy_2O_3$, $Gd_2O_3$, $Sm_2O_3$ and $Pr_2O_3$. From the standpoint of cost, in particular, it is desired to use $Y_2O_3$ or $Yb_2O_3$.

It is desired that the above component of the iron group is contained in the electrode-support substrate 10 in an amount of 35 to 65% by volume, and the rare earth oxide is contained in the electrode-support substrate 10 in an amount of 35 to 65% by volume. The electrode-support substrate 10 may contain other metal components and oxide components within ranges in which they do not spoil the required properties, as a matter of course.

The electrode-support substrate 10 constituted by the above metal component of the iron group and the rare earth oxide must permit the fuel gas to pass through and, usually, has an open porosity of, desirably, not smaller than 30% and, particularly, in a range of 35 to 50%. Its conductivity is, desirably, not smaller than 300 S/cm and, particularly, not smaller than 440 S/cm.

It is desired that the flat plate 10a of the electrode-support substrate 10 has a length d of, usually, 15 to 35 mm, and a thickness t of about 2.5 to about 5 mm. Further, the curved portions 10b have a radius of curvature of about 1.25 to about 2.5 mm.

(Gas Flow Passages 16)

The plurality of gas flow passages 16 in the electrode support substrate 10 are usually arranged side by side along a center line X extending in the lengthwise direction of the flat plate 10a maintaining an equal distance as illustrated in FIG. 1. Here, it is desired that the arrangement of the gas flow passages 16 is satisfying a predetermined condition. Concretely speaking, referring to FIG. 2 which is an enlarged view of a portion of the electrode-support plate 10, if a distance between the gas flow passages 16 and the surface of the flat plate 10a is denoted by $L_1$ and a distance between the neighboring gas flow passages by $L_2$, then, it is desired that a relationship $L_1 < L_2$ is satisfied.

That is, the electrode-support substrate 10 is produced by molding a paste containing a powder of a substrate-forming material into a predetermined shape followed by drying and firing. Being provided with a plurality of gas flow passages 16 therein, however, the electrode-support substrate 10 is often cracked due to the heating at the time of drying or firing or due to heat generated at the time of generating electricity (it is presumed that tensile stress generates due to the contraction among the gas flow passages 16 at the time of drying, firing or generating electricity). In order to shorten the current path, in particular, it is desired to decrease the thickness t of the flat plate 10a of the electrode-support substrate 10, but cracks tend to occur as the thickness t decreases. However, by selecting the distance $L_1$ between the gas flow passages 16 and the flat plate 10a to be smaller than the distance $L_2$ between the gas flow passages 16, the surface of the flat plate 10a contracts quicker than the contraction between the gas flow passages 16. As a result, the contraction (tensile stress) between the gas flow passages 16 is relaxed, and the occurrence of cracks is effectively suppressed. This embodiment is desirable even from the standpoint of enhancing the power generating efficiency by shortening the current path, since the distance $L_2$ is large between the gas flow passages 16 which are the portions where the current flows linearly.

In the present invention, further, if a distance between a curved portion 10b and the gas flow passage 16a located on the side of the curved portion 10b of the electrode-support substrate among the plurality of gas flow passages 16, is denoted by $L_3$ (see FIG. 2), it is desired that a relationship $L_3 > L_1$ is satisfied. That is, in producing the electrode-support substrate 10 through drying and firing, the curved portion 10b contracts most quickly (since the curved portion 10b has a large surface area). As a result, a large tensile stress generates between the curved portion 10b and the gas flow passage 16a, and the curved portion 10b tends to be cracked. By maintaining the relationship $L_3 > L_1$, however, contraction of the surface of the flat plate 10a is promoted, contraction of the curved portion 10a is relaxed, and occurrence of cracks at the curved portion 10b is effectively suppressed.

Figure 2:
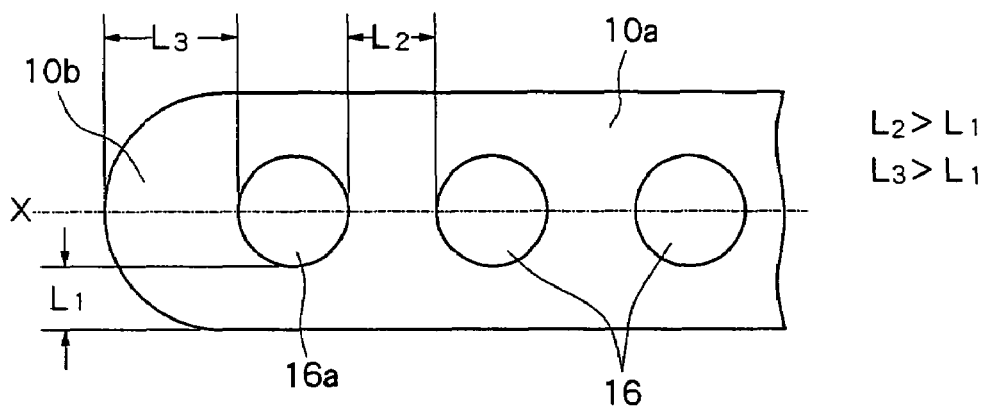
FIG. 2 is a view illustrating, on an enlarged scale, a portion of the electrode-support substrate in FIG. 1.

From the standpoint of preventing cracking in the above-mentioned embodiment illustrated in FIG. 2, it is desired that the distance $L_1$ between the gas flow passages 16 and the surface of the flat plate 10a is in a range of 0.5 to 1 mm, the distance $L_2$ between the neighboring gas flow passages 16 is in a range of 1 to 2 mm, and the distance $L_3$ between the gas flow passage 16a and the curved portion 10b is in a range of 1 to 3 mm.

Figure 3:
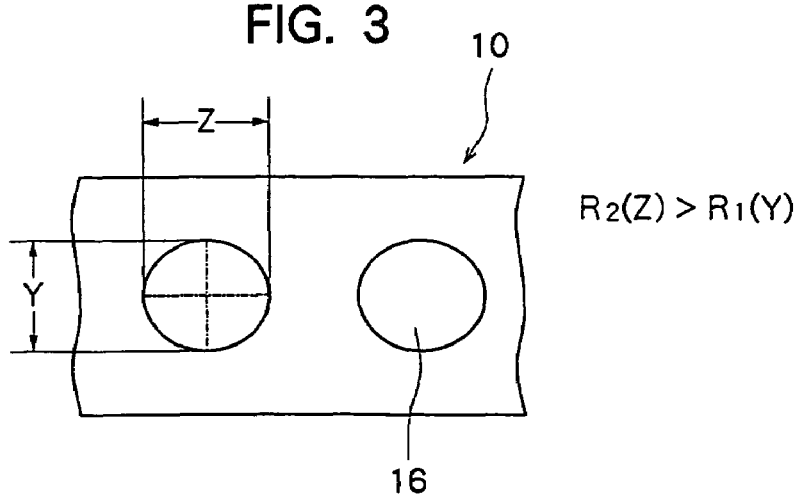
FIG. 3 is a view illustrating a suitable shape of gas flow passages in the electrode-support substrate.

The opening of the gas flow passage 16 usually has a circular shape. In the present invention, however, the opening may be formed in an elliptic shape. As shown in FIG. 3, in particular, it is desired that of the opening of the gas flow passage 16 is of an elliptic shape having a short axis Y extending in the direction of thickness of the flat plate 10a and having a long axis Z extending in the lengthwise direction of the flat plate 10a. Further, if the length of the short axis Y is denoted by $R_1$ and the length of the long axis Z by $R_2$, it is desired that a relationship $R_2 \geq 1.03\, R_1$ is satisfied. Namely, in the electrode-support substrate 10, the portion between the flat plate 10a and the gas follow passages 16 becomes the thinnest. The thinnest portion tends to be cracked due to thermal stress stemming from thermal hysteresis at the time of firing, reduction or generating electricity. By forming the openings of the gas flow passages 16 in the elliptic shape as described above, the gas flow passages 16 have a large radius of curvature at the thinnest portion. Therefore, thermal stress is relaxed in the thinnest portion very effectively preventing the occurrence of cracks.

In the present invention, the conditions illustrated in FIGS. 2 and 3 become effective particularly when the thickness of the flat plate 10a is decreased to be smaller than 8 mm and, particularly, smaller than 5 mm.

(Fuel Cell Layer 11)

The fuel electrode layer 11 which is the inner electrode layer is for producing the electrode reaction of the above-mentioned formula (2), and is made of a known porous electrically conducting ceramic material. For example, the fuel electrode layer 11 comprises $ZrO_2$ in which a rare earth element is solid-dissolved and Ni and/or NiO. This $ZrO_2$ (stabilized zirconia) in which the rare earth element is solid-dissolved may be the one that is used for forming the solid electrolyte layer 12 described below.

It is desired that the content of the stabilized zirconia in the fuel electrode layer 11 is in a range of from 35 to 65% by volume, and the content of Ni or NiO is from 65 to 35% by volume. It is further desired that the fuel electrode layer 11 has an open porosity of not smaller than 15%, particularly, in a range of 20 to 40%, and has a thickness of 1 to 30 μm. When the thickness of the fuel electrode layer 11 is too small, performance for collecting electricity may decrease. When the thickness is too great, on the other hand, the solid electrolyte layer 12 may peel off the fuel electrode layer 11 due to a difference in the thermal expansion.

The fuel electrode layer 11 may exist only at a position where it is opposed to the oxygen electrode layer 13. To increase the strength of junction between the solid electrolyte layer 12 and the electrode-support substrate 10, however, it is desired that the fuel electrode layer 11 is formed over the whole lower surface of the solid electrolyte layer 12 and is extending up to both sides of the interconnector 14 as illustrated in, for example, FIG. 1. It is allowable to form the fuel electrode layer 11 over the whole circumference of the electrode support substrate 10. In this case, the fuel electrode layer 11 as an intermediate film described later is interposed between the interconnector 14 and the electrode-support substrate 10.

(Solid Electrolyte Layer 12)

The solid electrolyte layer 12 provided on the fuel electrode layer 11 must work as an electrolyte for handing over the electrons across the electrodes and must further have a gas shut-off property for preventing the leakage of the fuel gas and the oxygen-containing gas, and is usually made of $ZrO_2$ (usually called stabilized zirconia) in which 3 to 15 mol % of rare earth elements are solid-dissolved. As the rare earth elements, there can be exemplified Sc, Y, La, Ce, Pr, Nd, Pm, Sm, Eu, Gd, Tb, Dy, Ho, Er, Tm, Yb and Lu. From the standpoint of cost, however, it is desired to use Y and Yb.

It is desired that the stabilized zirconia ceramics forming the solid electrolyte layer 12 has a relative density (as measured by the Archimedes' method) of not smaller than 93% and, particularly, not smaller than 95% from the standpoint of preventing the gas permeability, and that the solid electrolyte layer 12 has a thickness of 10 to 100 µm.

(Oxygen Electrode Layer 13)

In the fuel cell of the present invention as is clear from FIG. 1, the oxygen electrode layer 13 which is the outer electrode layer is opposed to only the surface of the flat plate 10a of the electrode-support substrate 10 where the interconnector 14 is not provided, but is not opposed to the curved portions 10b. Namely, the oxygen electrode layer 13 is a flat layer without being bent and can be easily formed so as to possess a uniform thickness. By forming the oxygen electrode layer 13 on the above position, further, the oxygen electrode layer 13 and the interconnector 14 are opposed to each other all via the flat plate 10a. Therefore, the electric current flows in the direction of thickness of the electrode-support substrate, the electric resistance decreases, a voltage drop is suppressed, and the output density increases.

As is clear from FIG. 1, further, both ends of the oxygen electrode 13 are located on the outer sides of both side ends of the interconnector 14, and have an area larger than the interconnector 14. By forming the oxygen electrode layer 13 having an area larger than that of the interconnector 14, a predetermined effective electrode area is maintained despite the position of the outer electrode layer is deviated to some extent at the time of molding, and stable characteristics are maintained. For example, it is desired that a distance D between an end of the oxygen electrode layer 13 and an end of the interconnector 14 is, usually, in a range of 0.5 to 4 mm. If the distance D is too small, the effective electrode area varies and the characteristics fluctuate due to positional deviation or the like at the time of producing the cell. Even if the distance D is excessively increased, the cell simply becomes bulky or the effective electrode area simply decreases due to a decrease in the size of the interconnector 14, and no particular advantage is obtained.

The oxygen electrode layer 13 is made of an electrically conducting ceramic material of a perovskite oxide of the so-called $ABO_3$ type. As the perovskite oxide, there can be used at least any one of a transition metal perovskite oxide and, particularly, an $LaMnO_3$ oxide, an $LaFeO_3$ oxide or an $LaCoO_3$ oxide having La at the site A. Among them, the $LaFeO_3$ oxide is particularly preferred from the standpoint of a high electric conductivity at an operation temperature of about 600 to about 1000° C. In the above perovskite oxide, Sr may exist together with La at the site A, or Co and Mn may exist together with Fe at the site B.

The oxygen electrode layer 13 must permit the gas to pass through. It is therefore desired that the above-mentioned electrically conducting ceramics (perovskite oxide) has an open porosity of not smaller than 20% and, particularly, in a range of 30 to 50%. It is further desired that the oxygen electrode layer 13 has a thickness of 30 to 100 µm from the standpoint of collecting electricity.

As required, a diffusion preventing layer (not shown) may be interposed between the oxygen electrode layer 13 and the solid electrolyte layer 12. The diffusion preventing layer is made of, for example, a Ce oxide ($CeO_2$) in which Sm is solid-dissolved, and works to avoid such an inconvenience that elements in the oxygen electrode layer 13 diffuse into the solid electrolyte layer 12 at the time of firing or generating electricity to form an insulating layer on the interface between the two.

(Interconnector 14)

The interconnector 14 is provided on one surface of the flat plate 10a of the electrode-support substrate 10 so as to be opposed to the oxygen-electrode layer 13, is made of electrically conducting ceramics, and must have resistance against the reduction and resistance against the oxidation since it comes in contact with the fuel gas (hydrogen) and oxygen-containing gas. As the electrically conducting ceramics, therefore, there can be usually used a perovskite oxide ($LaCrO_3$ oxide) of the type of lanthanum chromite. To prevent the leakage of fuel gas that passes through the interior of the electrode-support substrate 10 and of oxygen-containing gas that passes through the exterior of the electrode-support substrate 10, further, the electrically conducting ceramics must be dense having a relative density of, for example, not smaller than 93% and, particularly, not smaller than 95%.

It is desired that the interconnector 14 has a thickness of 30 to 200 µm from the standpoint of preventing the leakage of gas and electric resistance. When the thickness is smaller than this range, the gas tends to leak. When the thickness is larger than this range, on the other hand, the electric resistance increases and the electricity-collecting function may decrease due to a drop of potential.

As is clear from FIG. 1, further, to prevent the leakage of the gas, the dense solid electrolyte layer 12 is intimately adhered onto both sides of the interconnector 14. To obtain a high sealing performance, however, it is also allowable to provide a junction layer (not shown) comprising, for example, $Y_2O_3$ between both side surfaces of the interconnector 14 and the solid electrolyte layer 12.

Further, a P-type semiconductor layer (not shown) may be provided on the outer surface (upper surface) of the interconnector 14. Namely, in a cell stack (see FIG. 5) assembled by using the fuel cells 1, an electrically conducting collector member 20 is connected to the interconnector 14. If the collector member 20 is directly connected to the interconnector 14, however, the potential greatly drops due to non-ohmic contact, and the electricity-collecting performance may decrease. By connecting the collector member 20 to the interconnector 14 through a P-type semiconductor layer, however, the ohmic contact is established between the two. Therefore, the voltage drop decreases, and a decrease in the electricity-collecting performance is effectively avoided. As the P-type semiconductor, there can be exemplified a transition metal perovskite oxide. Concretely speaking, there can be used P-type semiconductor ceramics having electron conductivity larger than that of the $LaCrO_3$ oxide that constitutes the interconnector 14, e.g., there can be used at least the one of an $LaMnO_3$ oxide, an $LaFeO_3$ oxide or an LaCoO$_3$ oxide in which Mn, Fe or Co is present at the site B. It is desired that the P-type semiconductor layer has a thickness of, usually, in a range of 30 to 100 μm.

The interconnector 14 may be directly provided on one surface of the flat plate 10a of the electrode-support substrate, or may be provided on one surface of the flat plate 10a via an intermediate film (not shown). The intermediate film usually comprises ZrO$_2$ (above-mentioned stabilized zirconia) in which rare earth elements are solid-dissolved and Ni and/or NiO. Upon adjusting the Ni content in the intermediate film, a difference in the coefficient of thermal expansion can be decreased between the interconnector 14 and the electrode-support substrate 10, and peeling due to thermal stress is prevented from occuring on the interface between the two.

It is desired that the intermediate film contains Ni component (Ni and/or NiO) in an amount of 35 to 80% by volume and, particularly, 50 to 70% by volume in the total amount calculated as Ni. The intermediate film that contains Ni component exhibits an enhanced electric conductivity; i.e., potential effect due to the intermediate film is suppressed. Further, the stabilized zirconia in the intermediate film helps adjust the coefficient of thermal expansion. For example, upon adjusting the coefficient of thermal expansion of the intermediate film to lie in a range between that of the interconnector 14 and that of the electrode-support substrate 10 (or solid electrolyte layer 12), it is allowed to prevent the peeling that stems from a difference in the coefficient of thermal expansion. It is desired that the thickness of the intermediate film is usually not larger than 20 μm and, particularly, in a range of not larger than 10 μm to decrease the potential drop.

As will be understood from its composition, further, the intermediate film may be a fuel electrode layer 11. Namely, the fuel electrode layer 11 is provided over the whole circumference of the electrode-support substrate 10, and the interconnector 14 is provided on the fuel electrode layer 11.

The fuel cell 1 of the invention described above is not limited to the one of the structure illustrated in FIG. 1 but may employ a variety of constitutions so far as the outer electrode layer is formed at a predetermined position.

For example, the positional relationship between the fuel electrode layer 11 and the oxygen electrode layer 13 may be reversed. That is, the oxygen electrode layer may be provided as the inner electrode layer and the fuel electrode layer may be provided as the outer electrode layer. In this case, the oxygen-containing gas such as the air is fed into the gas flow passages 16 formed in the flat plate 10a of the electrode-support substrate 10, and the fuel gas is fed to the outer side of the cell 1 (outer side of the fuel electrode layer) to generate electricity. The flow of electric current is reversed to that of the fuel cell of the structure of FIG. 1.

Figure 4:
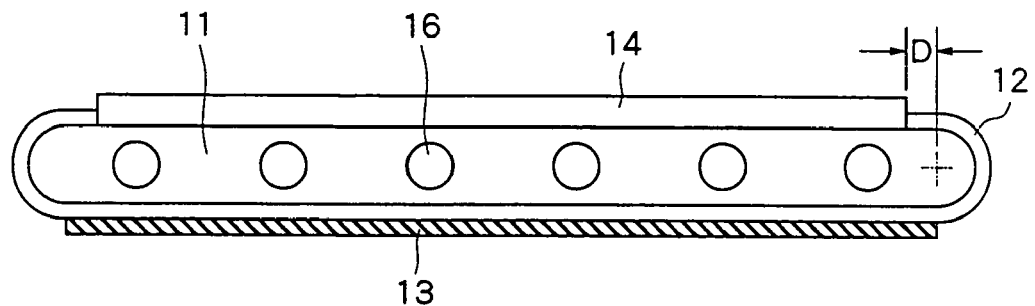
FIG. 4 is a transverse sectional view illustrating another structure of the fuel cell of the present invention.

In the embodiment of FIG. 1, the electrode-support substrate 10 and the inner electrode layer are separately formed. However, the electrode-support substrate 10 itself can be used as the inner electrode. FIG. 4 illustrates a fuel cell of the above structure. This fuel cell 1 has substantially the same structure as that of the fuel cell of FIG. 1 except that the electrode-support substrate is formed by the fuel electrode 11.

(Production of the Fuel Cell)

The fuel cell having the structure of FIG. 1 described above is produced in a manner described below.

First, a powder of a metal of the iron group such as Ni or an oxide thereof, a powder of an oxide of a rare earth element such as Y$_2$O$_3$, an organic binder, and a solvent are mixed together to prepare a slurry thereof which is, then, extrusion-molded to obtain a molded electrode-support substrate followed by drying.

It is desired that the positions and sizes of the gas flow passages in the molded article are so set as to satisfy the conditional formulas related to FIG. 2 or 3 described above after firing, in order to prevent the occurrence of cracks. For example, a distance $L_2'$ between the neighboring gas flow passages and a distance $L_1'$ between the gas flow passages and the surface of the flat plate of the molded electrode-support substrate, are so set as to satisfy a relationship $L_2' > L_1'$. Further, the above distance $L_1'$ and a distance $L_3'$ between the gas flow passage and the side surface (curved portion) of the molded electrode-support substrate, are so set as to satisfy a relationship $L_3' > L_1'$. In this case, from the standpoint of satisfying the above-mentioned conditions and preventing the cracking after firing, it is desired that $L_1'$ is set to be in a range of 0.6 to 1.3 mm, $L_2'$ is set to be in a range of from 1.2 to 3.8 mm, and $L_3'$ is set to be in a range of from 1.2 to 3.8 mm. To reliably prevent the occurrence of cracking, it is desired that the drying is effected, for example, at room temperature for about 3 days and, then, at 80 to 150° C. for not shorter than 2 hours. As required, further, the calcining may be effected in a temperature region of 800 to 1100° C.

Next, a stabilized zirconia powder, an organic binder and a solvent are mixed together to prepare a slurry thereof which is then molded into a sheet for forming a solid electrolyte layer.

Further, a paste obtained by dispersing powders for forming the fuel electrode layer (Ni or NiO powder and stabilized zirconia powder) in a solvent such as an alcohol, is applied onto one surface of the sheet formed as described above for forming the solid electrolyte layer, thereby to form a coated layer for forming the fuel electrode layer on the solid electrolyte layer sheet.

The coated layer for fuel electrode layer formed on one surface of the solid electrolyte layer sheet is brought into contact at a predetermined position of the molded electrode-support substrate obtained above, and is laminated so as to obtain a layer structure as shown in, for example, FIG. 1, followed by drying.

Thereafter, a material for the interconnector (e.g., LaCrO$_3$ oxide powder), an organic binder and a solvent are mixed together to prepare a slurry thereof to thereby prepare a sheet for the interconnector. The sheet for the interconnector is laminated on a predetermined position of the laminate obtained above thereby to prepare a laminate for firing.

After the binder is removed, the laminate for firing is co-fired in an oxygen-containing atmosphere at 1300 to 1600° C.

A paste containing a powder for forming the oxygen electrode (e.g., LaFeO$_3$ oxide powder) and a solvent and, as required, a paste containing a material for forming the P-type semiconductor layer (e.g., LaFeO$_3$ oxide powder) and a solvent, are applied by dipping onto a predetermined position of the sintered material obtained as described above, and are printed at 1000 to 130° C. to produce the fuel cell 1 of the invention having the structure as illustrated in FIG. 1.

When simple nickel is used for forming the electrode-support substrate 10 and the fuel electrode layer 11, Ni has been oxidized into NiO due to the firing in the oxygen-containing atmosphere. As required, however, NiO can be returned back to Ni through the reduction treatment. Further, NiO is exposed to the reducing atmosphere during the generation of electricity and is, hence, reduced to Ni during this period, too.

The fuel cells having different layer constitutions can be easily produced in compliance with the method described above.

(Cell Stack)

Figure 5:
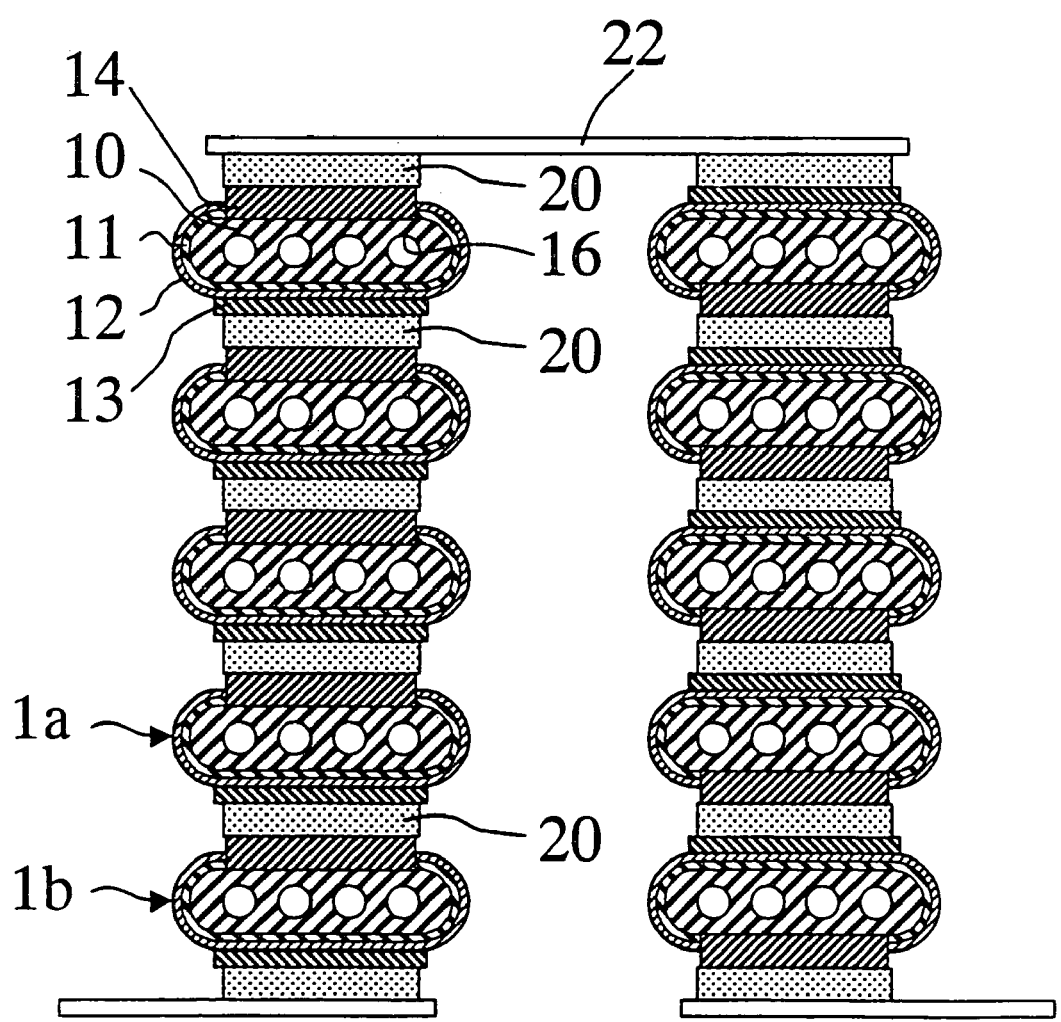
FIG. 5 is a transverse sectional view illustrating the structure of a cell stack constituted by using the fuel cells of FIG. 1.

Referring to FIG. 5, a cell stack is constituted by a set of a plurality of the fuel cells 1 which are electrically connected together while interposing the collector members 20 made of a metal felt and/or a metal plate among the fuel cells 1a of the one side and the fuel cells 1b of the other side that are neighboring to each other up and down. Namely, the electrode-support substrate 10 of the one fuel cell 1a is electrically connected to the oxygen electrode 13 of the other fuel cell 1b through the interconnector 14 and the collector member 20. Further, the cell stacks are arranged side by side as illustrated in FIG. 5, and the neighboring cell stacks are connected in series through a conductor member 22.

The cell stacks are accommodated in a predetermined container to constitute a fuel cell assembly. The container has an introduction pipe for introducing the fuel gas such as hydrogen from an external unit into the fuel cell 1, and an introduction pipe for introducing the oxygen-containing gas such as the air into space on the outer side of the fuel cell 1. Electric power is generated as the fuel cell is heated to a predetermined temperature (e.g., 600 to 900° C.), and the fuel gas and the oxygen-containing gas after used are discharged out of the container.

EXAMPLES

Example 1

An Ni powder having an average particle size of 0.5 μm and a $Y_2O_3$ powder were mixed together (volume ratio after firing: 48% by volume Ni and 52% by volume of $Y_2O_3$), and to the thus mixed powder were further mixed a pore-forming agent, an organic binder (polyvinyl alcohol) and water (solvent) to form a slurry which was, then, extrusion-molded into a rectangular parallelopiped shape to obtain a molded article for forming an electrode-support substrate, followed by drying.

Next, a sheet for forming the solid electrolyte layer was obtained by using a slurry of a mixture of the above YSZ powder, an organic binder (acrylic resin) and a solvent which was toluene.

Further, a slurry was prepared by mixing a $ZrO_2$ (YSZ) powder containing 8 mol % of $Y_2O_3$, an NiO powder, an organic binder (acrylic resin) and a solvent (toluene). The slurry was applied onto one surface of the sheet for forming the solid electrolyte layer to form a coated layer for forming the fuel electrode layer.

The sheet for forming the solid electrolyte layer and the molded electrode-support substrate were so laminated that the coated layer for forming the fuel electrode layer was brought into contact at a predetermined position of the molded electrode-support substrate thereby to form a layer structure illustrated in FIG. 1.

On the other hand, a sheet for forming the interconnector was prepared by using a slurry obtained by mixing an $LaCrO_3$ oxide powder having an average particle size of 2 μm, an organic binder (acrylic resin) and a solvent (toluene). The sheet was, then, laminated on an exposed portion of the of the molded support substrate in the laminated sheet so that both ends of the interconnector sheet were overlapped both ends of the solid electrolyte layer to obtain laminated sheets thereof for firing.

After the binder was removed, the laminated sheets for firing were co-fired in the atmosphere at 1500° C.

The obtained sintered body was immersed in a paste comprising an $La_{0.6}Sr_{0.4}Co_{0.2}Fe_{0.8}O_3$ powder having an average particle size of 2 μm and a solvent (normal paraffin), a coating layer for oxygen electrode was formed on a predetermined position on the surface of the solid electrolyte layer formed on the sintered body and, at the same time, the above paste was applied onto the outer surface of the interconnector formed on the sintered body, and a coating layer for forming the P-type semiconductor was formed, followed by printing at 1150° C. to produce a fuel cell of the structure as illustrated in FIG. 1.

Specifications of the thus produced fuel cell were as described below.

Electrode-Support Substrate:

| | |
|---|---|
| Gas flow passages: | six passages (shape of openings: circular, 1.8 mm in diameter) |
| $L_1$: | 0.7 mm |
| $L_2$: | 2.2 mm |
| $L_3$: | 2.1 mm |
| Length d of flat plate: | 26 mm |
| Thickness t of flat plate: | 3.2 mm |
| Radius of curvature of curved portion B: | 1.6 mm |
| Thickness of fuel electrode layer: | 10 μm |
| Thickness of solid electrolyte layer: | 40 μm |
| Thickness of oxygen electrode layer: | 50 μm |
| Thickness of interconnector: | 50 μm |
| Thickness of P-type semiconductor layer: | 50 μm |

The oxygen electrode layer was formed on only a portion opposed to the flat plate as illustrated in FIG. 1 but was not formed at all on the curved portions, such that the distance D relative to the ends of the interconnector was 1 mm.

The thus produced fuel cell was measured for its voltage drop and output density by the methods described below.

Voltage Drop:

Hydrogen was fed into the gas permeation holes in the electrode-support substrate of the fuel cell, the air was fed to the side of the oxygen electrode, electric power was generated at 850° C., and a voltage drop was found at a current density of 0.4 A/cm².

Output Density:

The output density was calculated from a current value of when the cell voltage was 0.7 V.

As a result, the voltage drop was 180 mV and the output density was 0.65 W/cm², i.e., the voltage drop was small and a high output density was obtained.

Comparative Example 1

Figure 6:
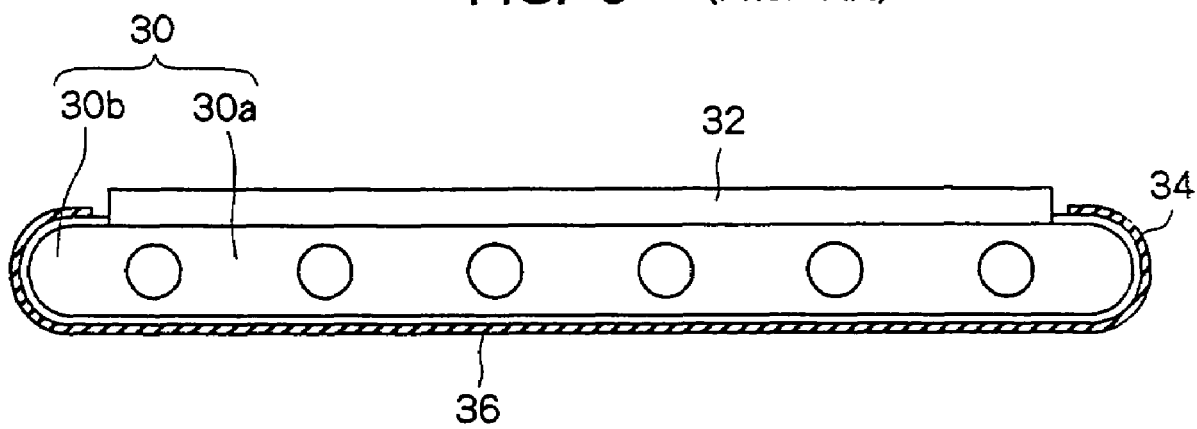
FIG. 6 is a transverse sectional view illustrating the structure of a conventional solid oxide fuel cell.

A fuel cell was produced in quite the same manner as in Example 1 but forming the oxygen electrode layer (outer electrode layer) even on the portions opposed to the curved portions of the electrode-support substrate as illustrated in FIG. 6 and extending it near to both side ends of the interconnector.

The fuel cell was measured for its voltage drop and output density. The voltage drop was 230 mV and the output density was 0.55 W/cm², which were both inferior to those of the fuel cell of Example 1.

Example 2

First, an NiO powder and a $Y_2O_3$ powder were mixed together (48% by volume of NiO powder calculated as metal Ni and 52% by volume of $Y_2O_3$ powder), and to the thus mixed powder were further mixed a pore-forming agent, a cellulose-type organic binder and water (solvent), and the mixture was extrusion-molded into a plate-like molded electrode-support substrate as illustrated in FIG. 1. The molded plate-like electrode-support substrates were produced in a number of thirty under each of various conditions.

During the extrusion molding, the positional relationships of gas flow passages in the molded support substrate represented by $L_1'$, $L_2'$, $L_3'$ were so varied as to assume sizes shown in Table 1 (there were six gas flow passages, the shape was circular in cross section, and the diameter was varied or the thickness of the molded support substrate or the distance between the side surfaces of the molded support substrate was changed to vary $L_1'$, $L_2'$ and $L_3'$)

After dried at room temperature, the molded electrode-support substrates were dried at 130° C. Thereafter, cracks among the gas flow passages and cracks in the side surfaces of the molded article were observed by eyes, and the ratio thereof was listed in Table 1. Thereafter, the molded electrode-support substrate was so worked that the length was 200 mm after firing, and was calcined at 1000° C.

By using the above support substrate, a fuel cell was produced in the same manner as in Example 1.

Next, a hydrogen gas was fed into the fuel cell, and the support substrate and the fuel electrode layer were reduced at 850° C. The obtained fuel cell was measured concerning the thickness of the electrode-support substrate, distance $L_1$ from the gas flow passages up to the surface of the flat plate of the electrode-support substrate, distance $L_2$ among the gas flow passages and distance $L_3$ from the gas flow passage up to the side surface (curved portion) of the electrode-support substrate, and the measured values were listed in Table 1.

By using the thus obtained fuel cells of acceptable quality, hydrogen was fed into the gas flow passages, the air was fed to the outer side of the fuel cells, the fuel cells were heated up to 850° C. by using a gas burner to generate electric power for 3 hours, and the generation of electric power was halted. The start and stop of power generation were repeated 10 times. Cracks on the side surfaces of the electrode-support substrate and cracks among the gas flow passages were as listed in Table 1.

From Table 1 above, in the sample No. 2 in which the electrode-support substrate has a relationship $L_2<L_1$ ($L_2'<L_1'$), defect due to the cracking among the gas flow passages after the step of drying was confirmed in 13 samples among 30 samples, from which it was learned that the yield was low. Similarly, in the sample No. 3 in which the electrode-support substrate has a relationship $L_3<L_1$ ($L_3'<L_1'$), defect due to the cracking between the side surface and the gas flow passage after the step of drying was confirmed in 14 samples among 30 samples, from which it was learned that the yield was low.

In the sample in which the electrode-support substrate possessed a relationship $L_2>L_1$ ($L_2'>L_1'$), no crack was observed among the gas flow passages or between the side surface and the gas flow passages, and the yield of production was high. Besides, even when start and stop were repeated 10 times, quite no crack occurred between the side surface and the gas flow passages.

Example 3

Sintered bodies were obtained in a number of 40 by effecting the co-firing in the same manner as in Example 1 but changing the shape of the openings of the gas flow passages in the obtained electrode-support substrate into the one having long axis/short axis ratios ($R_2/R_1$) as shown in Table 2. By using the sintered bodies, the oxygen electrode layer was printed in the same manner as in Example 1 to produce the fuel cells. Here, $R_1$ stands for a length of the axis extending in a direction (direction of thickness) perpendicular to the direction of length of the electrode-support substrate, and $R_2$ stands for a length of the axis extending in a direction (direction of thickness) in parallel with the direction of length of the electrode-support substrate.

Next, the hydrogen gas was fed into the fuel cell in the same manner as in Example 2, the fuel electrode layer was reduced, and the fuel cell after reduced was subjected to the power generation testing in the same manner as in Example 2.

After having conducted the co-firing, final firing (printing of the oxygen electrode layer), reduction processing and power generation testing, the above fuel cells were made sure concerning the occurrence of cracks in the electrode-support substrate, and the number of the electrode-support substrates (fuel cells) that developed cracks. The ratios of the number of the fuel cells that developed cracks to the number of the fuel cells that were treated, were listed in Table 2. The final firing (printing of the oxygen electrode layer), reduction processing and power generation testing were conducted by using the fuel cells of acceptable quality without developing cracks.

TABLE 1

| Sample No. | Molded article (mm) | | | Sintered article (mm) | | | Thickness of support substrate | Occurrence of cracks after drying | | Start and stop 10 times |
| | $L_1'$ | $L_2'$ | $L_3'$ | $L_1$ | $L_2$ | $L_3$ | | Among gas passages | Between side surface and gas passages | Cracks between side surface and gas passages |
| --- | --- | --- | --- | --- | --- | --- | --- | --- | --- | --- |
| 1 | 1 | 2 | 2 | 0.7 | 1.5 | 1.5 | 3.2 | 0/30 | 0/30 | 0/30 |
| 2 | 1 | 0.7 | 2 | 0.7 | 0.5 | 1.5 | 3.2 | 13/30 | 0/30 | 0/17 |
| 3 | 1 | 2 | 0.5 | 0.7 | 1.5 | 0.4 | 3.2 | 0/30 | 14/30 | 5/16 |
| 4 | 2 | 3 | 3 | 1.5 | 2.3 | 2.3 | 4.8 | 0/30 | 0/30 | 0/30 |
| 5 | 0.8 | 2.5 | 2.5 | 0.6 | 1.9 | 1.9 | 3.2 | 0/30 | 0/30 | 0/30 |

TABLE 2

| Sample No. | R2/R1 (after firing) | Number of cells that developed cracks | | | |
|---|---|---|---|---|---|
| | | After co-firing | After final | After reduction firing | After generation testing |
| 1 | 1.00 | 8/40 | 4/32 | 4/28 | 2/24 |
| 2 | 1.03 | 3/40 | 2/37 | 1/35 | 0/34 |
| 3 | 1.10 | 1/40 | 1/39 | 1/38 | 0/37 |
| 4 | 1.26 | 0/40 | 0/40 | 0/40 | 0/40 |
| 5 | 1.52 | 0/40 | 0/40 | 0/40 | 0/40 |
| 6 | 2.03 | 0/40 | 0/40 | 0/40 | 0/40 |
| 7 | 3.03 | 0/40 | 0/40 | 0/40 | 0/40 |

As shown in Table 2, in the sample No. 1 forming the gas passages having openings of a circular shape ($R_2/R_1=1$), defects occurred in 8 cells after the co-firing, in 4 cells after the final firing, in 4 cells after the reduction and in 2 cells after the power generation testing among 40 cells. After all, cracks were confirmed in 18 cells among the 40 cells, from which it was learned that the yield was low.

In the samples Nos. 2 to 7 forming gas passages having openings of an elliptic shape with ratios $R_2/R_1$ of not smaller than 1.03, small numbers of cells developed cracks after the co-firing, final firing, reduction and power generation testing, and the occurrence of defective products could be halved.

The invention claimed is:

1. A fuel cell comprising an electrically conducting electrode-support substrate, an inner electrode layer, a solid electrolyte layer, an outer electrode layer and an interconnector, wherein
said electrode-support substrate includes a flat plate portion having two flat surfaces which are in parallel with each other and forming a plurality of gas flow passages therein, and curved portions located at both ends of said flat plate portion;
said interconnector is formed on one of the two flat surfaces of said flat plate portion of said electrode-support substrate;
said inner electrode layer is formed on the other flat surface of said flat plate portion where the interconnector has not been provided, and the inner electrode layer may be extending from the other flat surface to the one flat surface through both curved portions;
said solid electrolyte layer is laminated on said electrode-support substrate so as to cover said inner electrode layer, and is extending from the other flat surface of said flat plate portion up to both side ends of said interconnector passing through both curved portions; and
said outer electrode layer is laminated on said solid electrolyte layer so as to be opposed to the other flat surface of said flat plate portion but so as not to be opposed to said curved portions, and its both ends are located on the other flat surface and on outer sides of corresponding portions to both side ends of said interconnector.

2. A fuel cell according to claim 1, wherein said inner electrode layer is a fuel electrode and said outer electrode layer is an oxygen electrode.

3. A fuel cell according to claim 1, wherein in said electrode-support substrate, the flat plate has a thickness of 2.5 to 5 mm, and the curved portions have a radius of curvature of 1.25 to 2.5 mm.

4. A fuel cell according to claim 1, wherein a plurality of gas flow passages are arranged side by side along a center line extending in a lengthwise direction of said flat plated.

5. A fuel cell according to claim 4, wherein if a distance between said gas flow passages and the one surface or the other surface of said flat plate is denoted by $L_1$ and the distance between the neighboring gas flow passages by $L_2$, a relationship $L_1<L_2$ is satisfied.

6. A fuel cell according to claim 5, wherein if a distance between the curved portion and one of said plurality of gas flow passages positioned on the side of the curved portion of said electrode-support substrate is denoted by $L_3$, a relationship $L_3>L_1$ is satisfied.

7. A fuel cell according to claim 4, wherein the openings of said gas flow passages are of an elliptic shape having a short axis extending in the direction of thickness of said flat plate and a long axis extending in the lengthwise direction of said flat plate.

8. A fuel cell according to claim 7, wherein if the length of said short axis is denoted by $R_1$ and the length of said long axis by $R_2$, a relationship $R_2 \geq 1.03 R_1$ is satisfied.

9. A fuel cell assembly having a fuel cell stack obtained by electrically connecting a plurality of fuel cells of claim 1 through an electrical member.

10. A fuel cell comprising an inner electrode substrate, a solid electrolyte layer, an outer electrode layer and an interconnector, wherein
said inner electrode substrate includes a flat plate portion having two flat surfaces which are in parallel with each other and forming a plurality of gas flow passages therein, and curved portions located at both ends of said flat plate portion;
said interconnector is formed on one of the two flat surfaces of said flat plate portion of said inner electrode substrate;
said solid electrolyte layer is laminated on said inner electrode substrate, and is extending from the other flat surface of said flat plate portion up to both side ends of said interconnector passing through both curved portions; and
said outer electrode layer is laminated on said solid electrolyte layer so as to be opposed to the other flat surface of said flat plate portion but so as not to be opposed to said curved portions, and its both ends are located on the other flat surface and on outer sides of corresponding portions to both side ends of said interconnector.

11. A fuel cell according to claim 10, wherein said inner electrode layer is a fuel electrode and said outer electrode layer is an oxygen electrode.

12. A fuel cell according to claim 10, wherein in said inner electrode substrate, the flat plate has a thickness of 2.5 to 5 mm, and the curved portions have a radius of curvature of 1.25 to 2.5 mm.

13. A fuel cell according to claim 10, wherein a plurality of gas flow passages are arranged side by side along a center line extending in a lengthwise direction of said flat plate.

14. A fuel cell according to claim 13, wherein if a distance between said gas flow passages and the one surface or the other surface of said flat plate is denoted by $L_1$ and the distance between the neighboring gas flow passages by $L_2$, a relationship $L_1<L_2$ is satisfied.

15. A fuel cell according to claim 14, wherein if a distance between the curved portion and one of said plurality of gas flow passages positioned on the side of the curved portion of said inner electrode substrate is denoted by $L_3$, a relationship $L_3>L_1$ is satisfied.

16. A fuel cell according to claim 13, wherein the openings of said gas flow passages are of an elliptic shape having a short axis extending in the direction of thickness of said flat plate and a long axis extending in the lengthwise direction of said flat plate.

17. A fuel cell according to claim 16, wherein if the length of said short axis is denoted by $R_1$ and the length of said long axis by $R_2$, a relationship $R_2 \geqq 1.03\ R_1$ is satisfied.

18. A fuel cell assembly having a cell stack obtained by electrically connecting a plurality of fuel cells of claim 10 through an electrical member.

* * * * *